United States Patent
Zhang et al.

(10) Patent No.: US 10,154,652 B2
(45) Date of Patent: Dec. 18, 2018

(54) MULTI-LAYER INFLATABLE TOY AND MANUFACTURING METHOD THEREOF

(71) Applicant: TONGFU MANUFACTURING CO., LTD, Nanjing, Jiangsu (CN)

(72) Inventors: Wen Zhang, Jiangsu (CN); Huixin Yuan, Jiangsu (CN)

(73) Assignee: TONGFU MANUFACTURING CO., LTD, Nanjing, Jiangsu (CN)

(*) Notice: Subject to any disclaimer, the term of this patent is extended or adjusted under 35 U.S.C. 154(b) by 172 days.

(21) Appl. No.: 15/104,297

(22) PCT Filed: Nov. 21, 2014

(86) PCT No.: PCT/CN2014/091885
§ 371 (c)(1),
(2) Date: Jun. 14, 2016

(87) PCT Pub. No.: WO2016/070467
PCT Pub. Date: May 12, 2016

(65) Prior Publication Data
US 2016/0316720 A1    Nov. 3, 2016

(30) Foreign Application Priority Data
Nov. 5, 2014   (CN) .......................... 2014 1 0617918

(51) Int. Cl.
*A01K 15/02*     (2006.01)
*A63H 3/06*      (2006.01)
*A63B 41/00*     (2006.01)
*B29D 22/02*     (2006.01)
*B29D 22/04*     (2006.01)
(Continued)

(52) U.S. Cl.
CPC ............ *A01K 15/025* (2013.01); *A63B 41/00* (2013.01); *A63H 3/06* (2013.01); *B29C 35/02* (2013.01); *B29D 22/02* (2013.01); *B29D 22/04* (2013.01); *A63H 23/10* (2013.01); *A63H 33/18* (2013.01);
(Continued)

(58) Field of Classification Search
None
See application file for complete search history.

(56) References Cited

U.S. PATENT DOCUMENTS

2013/0213316 A1    8/2013   Zhang et al.

FOREIGN PATENT DOCUMENTS

| CN | 2079525 U  | 6/1991  |
|----|------------|---------|
| CN | 1326315 A  | 12/2001 |

(Continued)

*Primary Examiner* — Monica A Huson
(74) *Attorney, Agent, or Firm* — Novick, Kim & Lee, PLLC; Allen Xue

(57) ABSTRACT

The present invention discloses a multi-layer inflatable toy and a manufacturing method thereof. The toy comprises a liner, an intermediate layer and a surface covering; the liner is filled with air, and the intermediate layer is arranged between the liner and the surface covering; the liner is made of rubber material, and the intermediate layer and the surface covering are made of flexible material or elastic material; and the intermediate layer may be of a single-layer or multi-layer structure. In the present invention, a pet toy of a multi-layer structure is manufactured by using a liner inflating process, so that the product is light and can float on water, thus the problem that the toy cannot be retrieved or used continuously after falling into water is avoided, and the harm to people and objects by throwing is avoided.

6 Claims, 2 Drawing Sheets

(51) Int. Cl.
　　　*B29C 35/02*　　　(2006.01)
　　　*B29K 21/00*　　　(2006.01)
　　　*B29K 75/00*　　　(2006.01)
　　　*A63H 33/18*　　　(2006.01)
　　　*A63H 23/10*　　　(2006.01)
(52) U.S. Cl.
　　　CPC .... *B29K 2021/003* (2013.01); *B29K 2075/00* (2013.01)

(56) References Cited

FOREIGN PATENT DOCUMENTS

| CN | 201324522 Y | 10/2009 |
| CN | 204170413 U | 2/2015 |

MULTI-LAYER INFLATABLE TOY AND MANUFACTURING METHOD THEREOF

TECHNICAL FIELD OF THE INVENTION

The present invention relates to the technical field of inflatable toys, and in particular to an inflatable toy of a multi-layer structure and a manufacturing method thereof.

BACKGROUND OF THE INVENTION

At present, the existing inflatable pet toys are mainly plastic blow molding products and rubber products. Blow molding products are prone to injuring people when throwing or causing harm to pets due to their rigidity, and are less tough and bite-resistant than rubber products due to their low elasticity. The conventional similar rubber products are generally made heavy in order to be tough and bite-resistant, and thus inconvenient to carry. Furthermore, the rubber products are generally fixed and monotone in style, and have a risk of causing harm to pets by throwing.

The existing conventional inflatable pet toys are almost of a single-layer structure and monotone in style, unaesthetic and poor in touch feeling, and inconvenient for biting by pets. As a result, interaction between people and pets is insufficient.

SUMMARY OF THE INVENTION

An objective of the present invention is to provide a multi-layer inflatable toy which is light and durable and improves the interaction between owners and their pets, in order to overcome the shortcomings of the prior art. Another objective of the present invention is to provide a method for manufacturing such a toy.

To achieve those objectives, the present invention employs the following technical solutions.

A multi-layer inflatable toy, including a liner, an intermediate layer and a surface covering; the liner is filled with air, and the intermediate layer is arranged between the liner and the surface covering; the liner is made of rubber material, and the intermediate layer and the surface covering are made of flexible material or elastic material; and the intermediate layer may be of a single-layer or multi-layer structure.

The toy is spherical or non-spherical; and the toy is provided with a lug structure which is in direct connection with the liner.

Further, the toy is in a ring shape, an elongated rod shape, an olive shape, a bone shape, a dumbbell shape, or a boomerang shape.

The lug structure is made of rubber material or plastic material.

The intermediate layer and the surface covering are made of thread, fabric or rubber material.

The fabric is mesh cloth, woolen cloth, braided fabric, or long or short plush.

A method for manufacturing the multi-layer inflatable toy of the present invention specifically includes following steps of: (1) putting tailored liner webs into a pre-heated spherical or non-spherical half-liner mold cavity, with the pre-heating temperature being 110° C. to 200° C.; (2) closing and putting the mold into a vulcanizer to vulcanize the webs by heating and pressurizing, the temperature used being 110° C. to 200° C.; (3) 1 min to 9 min later, opening the mold and taking out the finished liner; (4) filling the finished liner with air, sealing an air vent, and making an intermediate layer on the surface of the liner, where the intermediate layer may be made in a single-layer or multi-layer structure; (5) brushing the surface of the obtained intermediate layer with glue; (6) then, wrapping the outer surface of the intermediate layer with a surface covering; (7) deflating the wrapped product, and putting the wrapped product into a pre-heated profile mold for vulcanizing while keeping deflating; (8) after a period of time, taking out the vulcanized product; (9) deflating the product, and putting the product onto a specified machine to be equipped with a valve core; and (10) inflating once the valve core is equipped, up to which step, the multi-layer inflatable toy is completely manufactured.

Further, prior to the implementation of the step (5), a prepared lug structure accessory is taken out, a connecting surface of the lug structure is brushed with glue, and the liner and the lug structure accessory are put into a tooling to be bonded to each other.

Compared with the prior art, the present invention has the following advantages.

(1) In the present invention, a pet toy of a multi-layer structure is manufactured by using a liner inflating process, so that the product is light and can float on water, thus the problem that the toy cannot be retrieved or used continuously after falling into water is avoided, and the harm to people and objects by throwing is avoided.

(2) Since the liner of the product of the present invention is made of rubber material, the product has good elasticity. Meanwhile, since the product is of a multi-layer structure, and the number of intermediate layers may be increased according to actual requirements and the intermediate layers are made of soft material or elastic material, the toughness of the product is highly improved.

(3) By using the inflating process, the product of the present invention may be deflated at any time so that the product is small in volume and convenient to carry. The product is inflated before used.

(4) The use of a multi-layer structure in this inflatable toy can effectively realize the advantageous combination of a variety of materials and utilize the respective properties of the materials, thus the product is abundant in style, light, floatable, tough and bite-resistant. Meanwhile, the risk of causing harm to people and objects by throwing is greatly reduced.

(5) One end of the product of the present invention may be additionally provided with a lug structure which may be hold in mouth and retrieved by pets or hold by people, or may be provided with a rope by which a rally race may be carried out with pets to improve the interaction between owners and their pets.

(6) The product is abundant in style and structure: the inflatable structure of the present invention can be made into various specially-shaped products, for example, in an elongated rod shape, an olive shape, a dumbbell shape, a boomerang shape, or a ring shape or the like. Since the surface covering of the product may be made of rubber, woolen material or like, and LOGO, cartoons, conventional geometries or the like may be drawn depending upon the selected material as a pattern on its surface, the aesthetic perception is improved.

(7) Specially-shaped structures may be manufactured by the manufacturing method of the present invention, with simple steps and convenient operations. The manufacturing of the traditional spherical toys for pets is broken through. At present, there has been no related manufacturing method and application in the art.

DETAILED DESCRIPTION OF THE INVENTION

Embodiment 1

Figure 1:
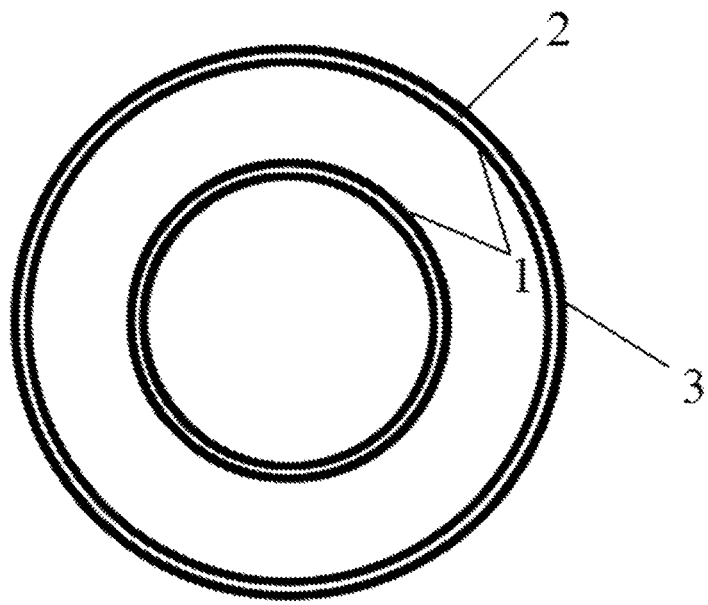
FIG. 1 is a structure diagram of a multi-layer inflatable toy according to Embodiment 1 of the present invention, in which: 1: liner; 2: intermediate layer; and 3: surface covering.

As shown in FIG. 1, the inflatable toy of this embodiment is in a ring shape, including a liner 1, an intermediate layer 2 and a surface covering 3. The liner 1 is made of rubber material, and the elasticity of the toy is thus improved. Rubber material mainly includes natural rubber and synthetic rubber. Plastic material includes thermoplastic rubber (TPR), thermoplastic elastomer (TPE), thermoplastic polyurethanes (TPU) and the like.

The intermediate layer 2 may be formed by winding threads or made of fabric or rubber material or the like. The fabric includes mesh cloth, long or short plush, or other braided fabric. The intermediate layer 2 can be of a multi-layer structure, and each layer may be made of same or different material. Thus, the toughness of the product is further enhanced. The surface covering 3 is mainly made of fabric or rubber material. A different pattern may be designed according to user preference, and the aesthetic perception is thus improved.

Embodiment 2

Figure 2:
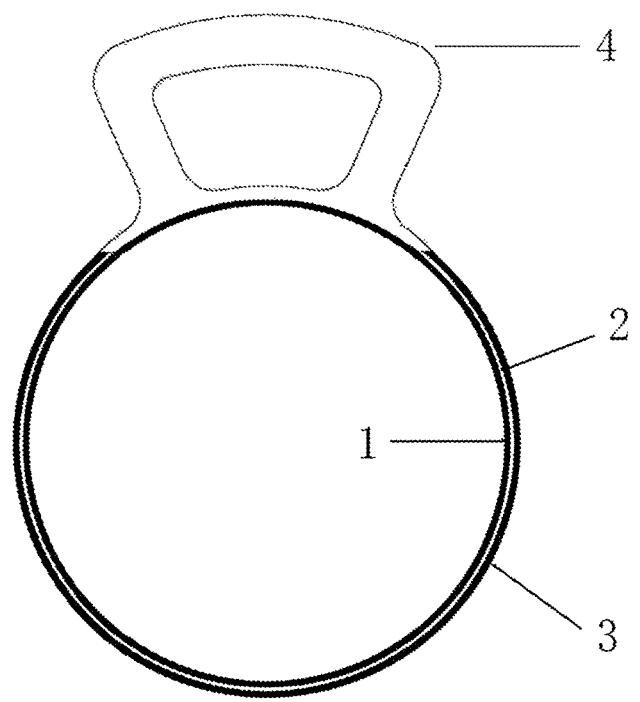
FIG. 2 is a structure diagram of a multi-layer inflatable toy according to Embodiment 2 of the present invention, in which: 4: lug structure.

As shown in FIG. 2, the inflatable toy of this embodiment is spherical, including a liner 1, an intermediate 2, a surface covering 3, and a lug structure 4 at one end. The lug structure 4 may be made of rubber material or plastic material. In this embodiment, the addition of the lug accessory makes the structure of the whole product become richer. It is convenient for the interaction between owners and their pets, and the practicality of such toys is greatly improved. Thus, the product has good application prospect.

Embodiment 3

Figure 3:
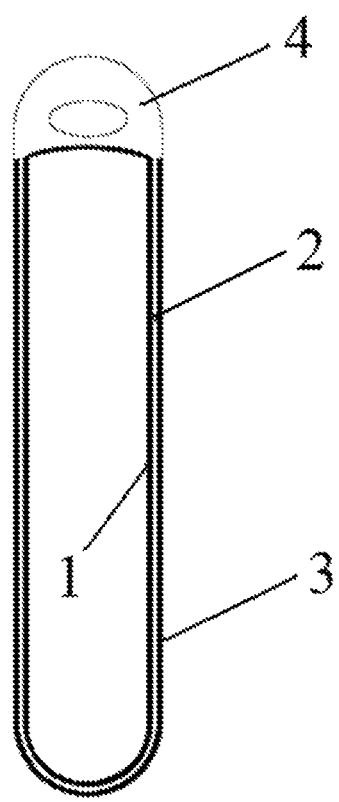
FIG. 3 is a structure diagram of a multi-layer inflatable toy according to Embodiment 3 of the present invention.

As shown in FIG. 3, the inflatable toy of this embodiment is non-spherical, including a liner 1, an intermediate 2, a surface covering 3, and a lug structure 4 at one end. A toy in such an elongated rod shape is easy for pets to hold in mouth. Of course, the multi-layer toy of the model may also be made in other special shapes to satisfy the requirements of different users. Thus, the practicality of the toy is improved.

Embodiment 4

This embodiment provides a method for manufacturing a multi-layer inflatable toy of the present invention, specifically including following steps:

(1) putting tailored liner webs into a pre-heated spherical or non-spherical half-liner mold cavity, with the pre-heating temperature being 110° C. to 200° C.;

(2) closing and putting the mold into a vulcanizer to vulcanize the webs by heating and pressurizing, the temperature used being 110° C. to 200° C.;

(3) 1 min to 9 min later, opening the mold and taking out the finished liner;

(4) filling the finished liner with air, sealing an air vent, and then putting the liner onto a winder for winding, i.e., making an intermediate layer on the surface of the liner, where the intermediate layer may be made in a plurality of layers as needed and the material of each layer may be the same or different;

(5) brushing the surface of the wound surface of the liner with glue;

(6) taking out a prepared lug structure accessory and brushing a connecting surface of the lug structure with glue, where the lug structure may be subjected to the vulcanizing process for rubber products, including the following steps: pre-heating the mold, filling with material, vulcanizing by heating and pressurizing, and taking out after a period of time;

(7) putting the liner and the lug structure accessory into a tooling 5 to be bonded for 1 min to 10 min;

(8) wrapping the wound outer surface of the intermediate layer with woolen cloth as a surface covering, where joints of the pieces of cloth are connected by special sizing material and the woolen cloth may be wound in various patterns;

(9) deflating the wrapped product, and putting the wrapped product into a pre-heated profile mold for vulcanizing while being inflated;

(10) after a period of time, taking out the vulcanized product;

(11) deflating the product, and putting the product onto a specified machine to be equipped with a valve core; and

(12) inflating once the valve core is equipped, up to which step, the multi-layer inflatable toy of the present invention is completely manufactured.

The invention claimed is:

1. A method for manufacturing a multi-layer inflatable toy, wherein the inflatable toy comprises a liner, a surface covering, and an intermediate layer between the liner and the surface covering, the method comprising:

(1) putting tailored liner webs into a pre-heated mold having a spherical or non-spherical half-liner mold cavity at a pre-heating temperature of 110° C. to 200° C.;

(2) closing the mold and putting the mold into a vulcanizer to vulcanize the tailored liner webs at a temperature of 110° C. to 200° C. for a duration of 1 min to 9 min;

(3) removing a liner from the mold;

(4) filling the liner with air, sealing an air vent on the liner, and attaching the intermediate layer on a surface of the liner, wherein the intermediate layer has a single-layered or multi-layered structure;

(5) applying a layer of glue on a surface of the intermediate layer;

(6) wrapping the surface covering about an outer surface of the intermediate layer;

(7) vulcanizing the wrapped product in a pre-heated profile mold;

(8) removing the vulcanized product from the profile mold after a predetermined period of time; and (9) deflating the vulcanized product, and installing a valve core on the deflated vulcanized product.

2. The manufacturing method according to claim 1, wherein, prior to step (5), bonding a lug structure and the liner with a glue.

3. The manufacturing method according to claim 1, wherein the intermediate layer, the surface covering, or both, are made of thread, fabric, or rubber.

4. The manufacturing method according to claim 2, wherein the intermediate layer, the surface covering, or both, are made of a material chosen from thread, fabric, or rubber.

5. The manufacturing method according to claim 1, further comprising inflating the deflated vulcanized product having the valve core.

6. The manufacturing method according to claim 1, wherein the wrapped product is inflated while being vulcanized in the pre-heated profile mold.

* * * * *